United States Patent [19]

Smith

[11] 4,342,529
[45] Aug. 3, 1982

[54] MULTIGRIP FASTENER

[75] Inventor: Walter J. Smith, Waco, Tex.

[73] Assignee: Huck Manufacturing Company, Irvine, Calif.

[21] Appl. No.: 224,916

[22] Filed: Jan. 14, 1981

Related U.S. Application Data

[63] Continuation of Ser. No. 26,652, Apr. 3, 1979, abandoned, which is a continuation-in-part of Ser. No. 899,591, Apr. 24, 1974, Pat. No. 4,208,943.

[51] Int. Cl.³ .............................................. F16B 19/05
[52] U.S. Cl. .................................................... 411/361
[58] Field of Search ........................ 411/361, 360, 337

[56] References Cited

U.S. PATENT DOCUMENTS

| | | | |
|---|---|---|---|
| 2,531,048 | 11/1950 | Huck . | |
| 2,972,274 | 2/1961 | Bombard et al. | 411/337 |
| 2,978,946 | 4/1961 | Looker | 411/361 |
| 3,192,821 | 7/1965 | Siebol | 411/41 |
| 3,230,818 | 1/1966 | Siebol | 411/34 |
| 3,232,162 | 2/1966 | Ketchum | 411/70 |
| 3,276,308 | 10/1966 | Bergere | 411/43 |
| 3,792,933 | 2/1974 | Stencel | 411/384 |
| 3,915,053 | 10/1975 | Ruhl | 411/361 |
| 4,208,943 | 6/1980 | Smith | 411/361 |

Primary Examiner—Robert L. Wolfe
Attorney, Agent, or Firm—Harness, Dickey & Pierce

[57] ABSTRACT

A unique two-part fastener consisting of a pin and a tubular member adapted to be set by a tool having a set of jaws to grip the pin and a swaging anvil for swaging the collar onto the pin and in which the pin has a set of substantially identical annular grooves formed along a major portion thereof and in which the set of annular grooves provide combination grooves some of which function as locking grooves and a selected one which functions as a breakneck groove and in one form the fastener including a second set of grooves of a different construction which function only as pull grooves; the first set of grooves provide a unique relationship with a swaged portion of the tubular member so that as the fastener is set, the pin will break off in a preselected one of the combination grooves within the outer end of the tubular member; the second set of grooves provide a construction which is compatible with a known type jaw structure on the tool.

18 Claims, 8 Drawing Figures

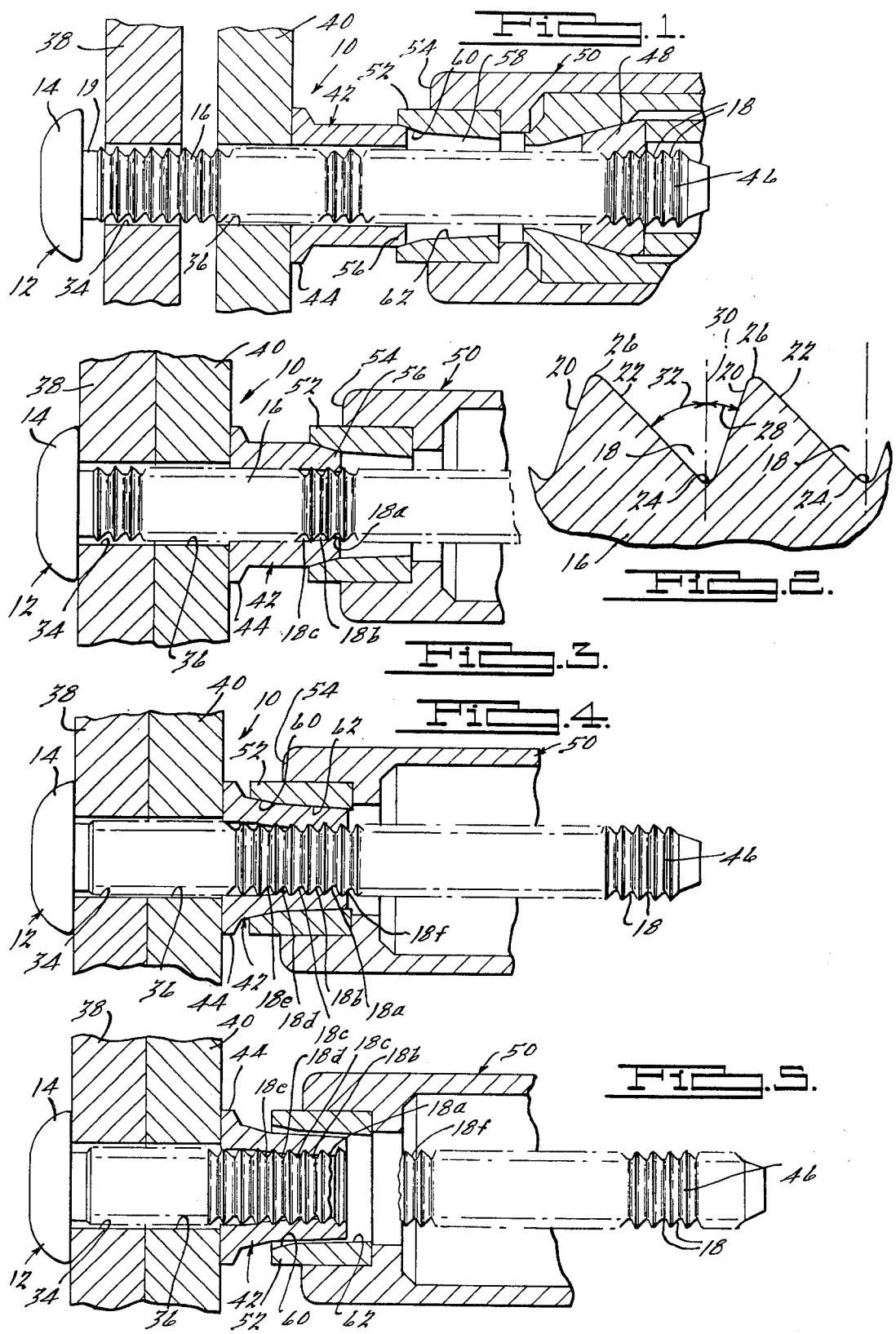

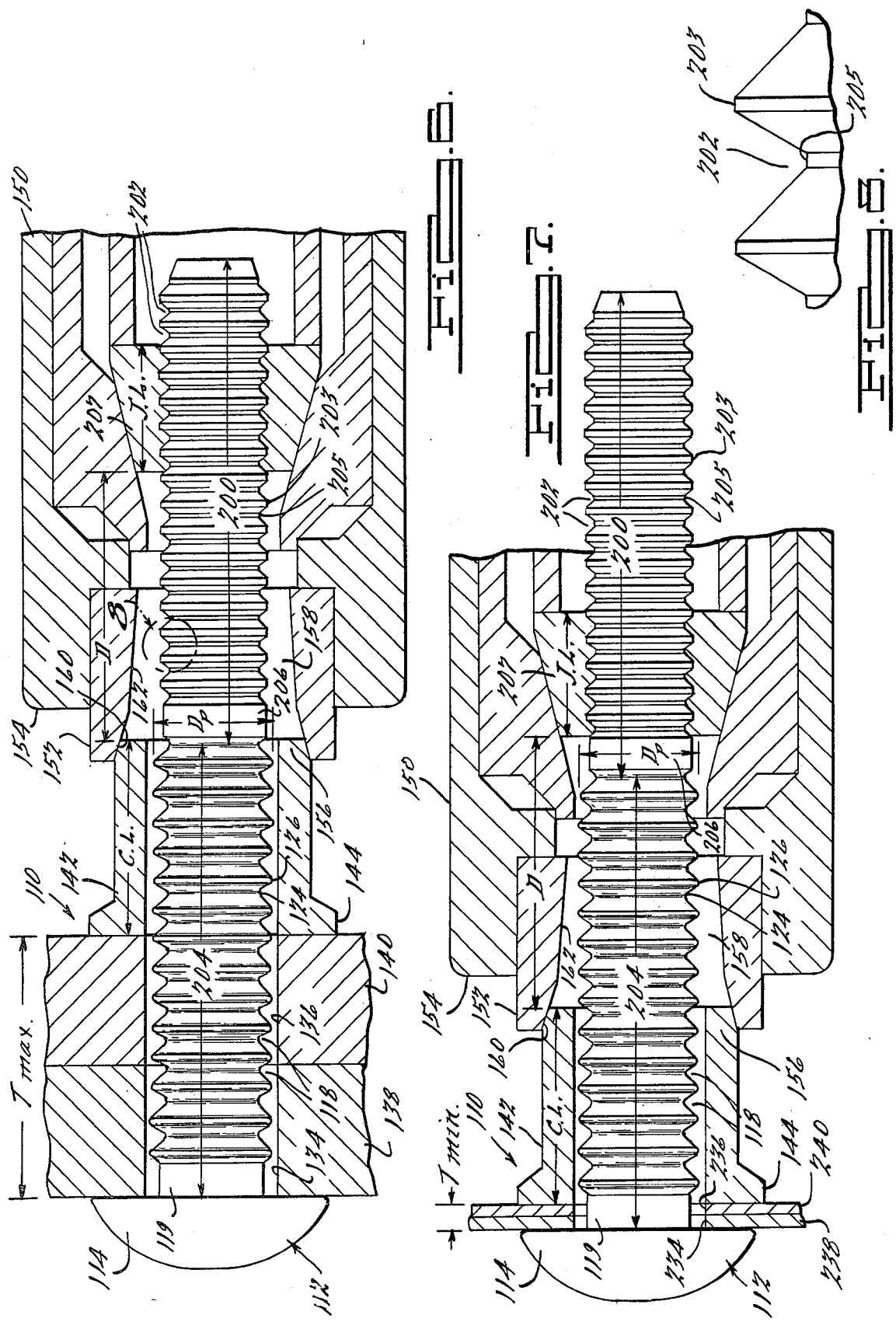

MULTIGRIP FASTENER

This is a continuation of application Ser. No. 26,652, filed Apr. 3, 1979 and now abandoned, which is a continuation-in-part of U.S. patent application Ser. No. 899,591, filed Apr. 24, 1974, now U.S. Pat. No. 4,208,943, issued June 24, 1980.

BACKGROUND AND SUMMARY OF THE INVENTION

The present invention relates generally to fasteners and more specifically to two piece fasteners which are adapted to be utilized in securing a broad range of material thicknesses.

In some applications it would be desirable to use a two piece fastener of the type employing a pin having combination locking and breakneck grooves and a tubular member adapted to be swaged thereto and in which any of these grooves is capable of functioning as a breakneck so as to enable a single fastener to be utilized over a broad range of material thicknesses. One problem with such a fastener is providing a structure in which the pin break will occur repeatedly and consistently in a desired one of the combination grooves.

This is accomplished by the present invention which utilizes a pin having a unique combination groove geometry. In addition, it is believed that the use of a selective relative hardness between the pin and associated tubular member further assists in the proper functioning of the fasteners. In the present invention, an axially directed force generated by the swaging of the tubular member into a preselected one of the combination grooves is utilized at a preselected groove which force when combined with a pulling force applied via a plurality of jaws by an installation tool will provide a combined tensile force at the selected groove whereby fracture will occur and hence that groove when selected functions as a breakneck. The groove geometry includes a pair of radially outwardly diverging sidewalls defining each groove, each of which sidewall forms a different angle with respect to a radial plane extending transversely through the pin member and controlled radius portions interconnecting adjacent end portions thereof.

Because of the unique contour of the combination grooves, conventional jaw structures in the installation tool may in some cases have reduced life and hence a modified jaw structure having teeth with a contour more closely matching that of the combination grooves may be desirable; however, in some cases it would be advantageous to be able to utilize tools with existing jaw structures. Thus in one form of the invention the end portion of the pin is provided with a plurality of pull grooves which are contoured differently from the combination grooves and which are adapted for use with existing jaw structures.

Accordingly, the present invention provides an improved two piece fastener having combination locking and breakneck grooves which extend along the shank portion of the pin a distance at least equal to the length of the shank portion less the minimum material thickness for which such fastener is to be used. This invention thereby enables a single fastener to be utilized to secured materials having a wide variety of total thicknesses. This feature affords substantial cost savings to users of such fasteners both by reducing the number of different fasteners required to be purchased and carried in their inventory as well as increasing product reliability by reducing the likelihood of a fastener with an inappropriate gripping range being inadvertently used. In one form of the invention an end portion of the pin is provided with a plurality of pull grooves of a shape different from that of the combinatin grooves with the pull grooves being adapted for use with existing jaw structures.

Additional advantages and features of the present invention will become apparent from the subsequent description and the appended claims taken in conjunction with the accompanying drawings.

BRIEF DESCRIPTION OF THE DRAWINGS

FIG. 1 is a partially sectioned view of a fastener in accordance with the present invention shown in operative relation to a pair of workpieces and having an installation tool in initial engagement with the fastener;

FIG. 2 is an enlarged fragmentary sectioned view of a portion of the fastener pin of FIG. 1 illustrating the groove geometry of the present invention, the section being taken along an axial plane;

FIGS. 3, 4 and 5 are a sequence of views each similar to FIG. 1 but illustrating the installation sequence from initial swaging of the tubular member through completed swage and pin break;

FIG. 6 is a partially sectioned view of a modified form of fastener of the present invention shown with workpieces of a minimum combined thickness and with a portion of an installation tool;

FIG. 7 is a partially sectioned view of the modified form of fastener of FIG. 6 shown with workpieces of a maximum combined thickness and with a portion of an installation tool; and FIG. 8 is an enlarged fragmentary, sectioned view of the portion of the fastener pin of FIG. 6 shown in the circle designated by the numeral 8 and illustrating the groove geometry of pull grooves on the pin.

DESCRIPTION OF THE PREFERRED EMBODIMENT

Referring now to the drawings and in particular to FIGS. 1 and 2 thereof, there is illustrated a fastener indicated generally at 10 in accordance with the present invention and comprising a pin member 12 having a head 14 provided on one end thereof and an elongated shank portion 16.

Shank portion 16 has a plurality of substantially identical annular combination locking and breakneck grooves 18 extending along substantially the entire length thereof and may include a relatively short smooth cylindrical portion 19 immediately adjacent the juncture with head 14. While smooth cylindrical portion 19 is illustrated as being relatively short, it may extent up to a length equal to a predetermined minimum total material thickness with which fastener 10 is to be used. Thus, grooves 18 will extend along the length of shank 16 from a point greater than this predetermined minimum thickness. Each of grooves 18 is defined by radially outwardly diverging sidewalls 20 and 22 which are connected at their radially inner ends by a generally concave radiused portion 24. The radially outer end of sidewall 20 is interconnected with the radially outer end of sidewall 22 of the next adjacent groove 18 by a generally convex radiused portion 26 and, in like manner, a substantially identical convex radiused portion 26 also connects the radially outer end of sidewall 22 with sidewall 20 of the next adjacent groove 18.

As best seen with reference to FIG. 2, sidewall 20 is disposed at a substantially smaller angle 28 relative to a radial plane 30 extending transversely through the shank portion 16 than the angle 32 formed between sidewall 22 and radial plane 30. It has been found that the present invention provides satisfactory results when angle 28 is approximately 20° and angle 32 is approximately 45°.

Another important aspect of the present invention resides in the provision of the convex radiused portions 26 and concave radiused portions 24. It has been found that consistent results have been achieved with pin members having a shank diameter of approximately 0.25 inches when the concave radiused portions 24 have a radius no less than around 0.005 inches and are preferably in the range of from around 0.005 to about 0.010 inches. It has also been found that consistent results are achieved with such pin members when the convex radiused portions 26 have a radius less than around 0.010 inches. The selection of radii for portions 24 and 26 as noted promotes consistency in operation. As the pin diameter increases, the preferred range for concave radiused portion 24 will also increase in a substantially linear relationship maintaining a ratio in the range of approximately 50:1 to 50:2. Similarly with respect to the convex radiused portion, the allowable maximum radius may also increase in a substantially linear relationship to increasing diameter such that the ratio of pin diameter to convex radius is approximately a maximum of 50:2.

Referring now to FIGS. 1 and 3 through 5, it is seen that fastener 10 is designed to be inserted in aligned openings 34 and 36 provided in a pair of members 38 and 40, respectively, which are to be joined by fastener 10. A tubular member 42 in the form of a generally cylindrically shaped collar is placed on shank portion 16 with flanged end portion 44 thereof being brought into engagement with member 40. As shown, shank portion 16 is of a length substantially greater than the total thickness of members 38 and 40 plus the axial length of collar 42 thereby providing an end portion 46 also having combination grooves 18 which grooves may be engaged by jaws 48 of pulling tool 50.

Pulling tool 50 is of conventional construction having a swaging anvil 52 extending outwardly from the nose portion 54 of the tool 50; the jaws 48 are adapted to be moved rearwardly relative to anvil 52 as shown in the drawings. Anvil 52 of pulling tool 50 has a central frusto conically shaped opening 58 provided therein having a first relatively sharply tapered inner portion 60 and second tapered inner portion 62. It has been found that an anvil in which portion 60 is provided with a taper of approximately 31.5° relative to the axis thereof and extending inward a distance of about 0.090 inches and portion 62 is provided with a taper of approximately 7° relative to the axis thereof produces satisfactory results in setting fasteners of the present invention.

Actuation of pulling tool 50 will cause jaws 48 to engage and grip a predetermined number of combination grooves 18 and thereby exert a pulling or tensioning force upon pin 12 and against collar 42. During the initial stages of the pulling action, anvil 52 exerts an oppositely directed force on collar 42 thereby causing members 38 and 40 to be drawn into mutual engagement.

Thereafter, as best seen in FIG. 3, portion 60 of anvil 52 begins to deform or cause the outer end portion 56 of collar 42 to be extruded into a preselected one 18a of combination grooves 18. This initial deformation causes a locking action to occur between collar 42 and pin 12. Thereafter, continued movement of jaws 48 cause anvil 52 to move along collar 42 thereby causing the collar material to flow into combination grooves 18b, c, d, e and possibly others approaching members 38 and 40 as well as continuing to compress the collar material which has been swaged into groove 18a.

Because of the defined groove configuration, the continued compression and flow of the collar material into groove 18a causes an axially directed localized force to be exerted on sidewall 20 as a portion of the collar material experiences a backward extrusion or flowing to the right as seen in the drawings into the next outwardly disposed groove 18f. The axial component of swaging or material flow force developed by this continued compression and flow of the collar material in combination with the axial tension exerted by the pulling action of the jaws 48 will cause groove 18a to function as a breakneck with end portion 46 of pin 12 breaking thereat. As illustrated, groove 18a is desirably the outermost groove which is first filled with collar material.

As previously mentioned, concave radiused portion 24 is selected so as to provide an area of predetermined controlled stress concentration which facilitates fracture thereby enabling the present invention to repeatedly control the desired groove at which portion 46 of shank 16 separates. Also, radiused convex portion 26 operates to facilitate metal flow into groove 18a thereby assisting in providing control of the selection of the groove at which fracture occurs.

The relative hardness of collar 42 with respect to pin 12 has also been found to be a contributing factor in the operation of the present invention in producing a commercially acceptable joint. A collar having too high a hardness relative to a given pin hardness will not provide sufficient metal flow to enable the generation of axial forces from metal flow within groove 18a. An excessively soft collar may operate to produce satisfactory pin breaking action but the resulting joint may then have insufficient strength to be commercially acceptable or practical. It has been found that with pin members 12 fabricated from steel and having a hardness in the range of approximately $15R_C$ to $25R_C$ a collar having a hardness in the range of approximately $45R_B$ to $65R_B$ produced satisfactory results.

It should be noted that in the present invention the tensile load required to be applied by the installation tool to effect pin break of the fastener when installed in combination with the tubular member will be lower than the tensile load required to effect pin break thereof without the cooperation of the tubular member.

In summary, the present invention comprises the concepts of the utilization of a pin having a plurality of similarly constructed grooves which function both as locking and breakneck grooves and in which the groove shape including the desired radiused portions provides a means whereby any one of the grooves located at a selected location proximate the outer end of the collar will function as a breakneck. In addition to the above, a desired relative pin and collar hardness assists in producing the desired result. This ability to consistently control the groove at which fracture occurs enables a single fastener to be manufactured which can accommodate a very broad range of material thicknesses.

It should also be noted that while the present invention has been described with reference to a two piece fastener having a pin and swageable collar, the principles are also applicable to fabrication of a blind fastener in which tubular member 42 may be in the form of a cylindrical sleeve having an outer portion adapted to be swaged to a pin in a manner similar to that described above.

In some cases it may be desirable to utilize the present invention with installation tools having jaws of a conventional structure and in the embodiment as illustrated in FIGS. 6–8 an end portion 200 is provided to have a plurality of pull grooves 202 which are contoured differently than the combination grooves 18 of FIGS. 1–5 and facilitate the use of jaws of a conventional structure. For purposes of simplicity in the embodiment of FIGS. 6 and 7, elements and portions similar to like elements and portions in the embodiment of FIGS. 1–5 and performing similar functions have been given the same numerical designations increased by '100's' i.e. workpieces 38 and 40 of FIGS. 1–5 become 138 and 140, respectively in FIG. 6.

Thus fastener 110 has a pin member 112 which now has an end portion 200 having a plurality of pull grooves 202 and an inner portion 204 having the combination locking and breakneck grooves 118 (similar to grooves 18 of FIGS. 1–5). The pull grooves 202 can be of a conventional structure such as that generally shown in FIG. 8. Note that the pull grooves 202 are more shallow than the combination grooves 118, i.e. crests 203 are not as high as crests 126 and roots 205 are not as deep as roots 124. At the same time the engaging teeth of jaws 207 are shaped similarly to pull grooves 202 resulting in a good match therebetween. The pull grooves 202 will not provide the desirable locking and breakneck characteristics of combination grooves 116 and therefore it is important that the collar 142 not be swaged into the pull grooves 202; thus while the crests 126 of combination grooves 118 are shaped and/or contoured to facilitate metal flow of the collar 142 and the roots 124 are shaped and/or contoured to provide a desired stress concentration, as previously described. The roots 205 of pull grooves 202 are shaped to avoid an effective stress concentration of the magnitude of that of grooves 118 and the crests 203 are not shaped to facilitate metal flow; thus pull grooves 202 can be designed to optimize the pulling function and the effectiveness of jaws 207. FIG. 6 therefore illustrates the condition of maximum grip, i.e. combined thickness, T max, for workpieces 138 and 140.

At the same time, since jaws 148 are shaped similarly to pull grooves 202 it is also important that the jaws 148 do not grip the pin member 112 at the combination grooves 118. Thus FIG. 7, illustrates the condition of minimum grip, i.e. combined thickness, T min, for workpieces 238 and 240.

It can be seen from FIG. 7 that the length of inner portion 204 with combination grooves 118, in order to accommodate the minimum grip condition, T min, will be at least equal to the sum of the minimum grip (T min) plus the length (C.L.) of the collar 142, i.e. T min+C.L. Once having determined the minimum grip, T min, the maximum grip (T max) will be approximately equal to the minimum grip, T min, plus the distance (D) measured from the point of engagement of the anvil 152 with the collar 142 to the forward face of the jaws 207. Now the length of inner portion 204 with combination grooves 118 in order to accommodate the maximum grip condition, T max, will be approximately equal to the sum of the minimum grip, T min, plus the length (C.L.) of collar 142 plus the anvil to jaw distance (D) i.e. T min+C.L.+D. Thus the grip range for the fastener 110 will be from T min to T max (and will be approximately equal to the distance D) and this grip range will be accommodated by one pin member 112 having an inner portion 204 with a length of (T min+C.L.+D). Note that in the application of the above formulations, accommodation will be made for the length of a transition portion 206 located between the combination grooves 118 and pull grooves 202. The length of transition portion 206 will, of course, be maintained at a minimum.

Assuming a T min of 1/16" and a collar length (C.L.) of ⅜" and an installation tool 150 having a D dimension of 9/16", then with inner portion 204 having a length of T min+C.L.+D=1/16"+⅜"+9/16" the fastener 110 will have a grip range of D or 9/16" and will be able to accommodate workpieces having a combined thickness in the range of from 1/16" to ⅝", i.e. with the ⅝" being the sum of T min plus D or 1/16"+9/16". A second pin member to accommodate workpieces of greater combined thicknesses can be readily determined by providing T min equal to ⅝" and then having T max equal to ⅝"+9/16" (T min+D) or 1-3/16"; in the latter situation the length of inner portion such as 204 would be T min+C.L.+D or ⅝"+⅜"+9/16" or 1-9/16". Note that the grip range still would be D or in the example given would be 9/16". The above are by way of examples and should be considered to be approximations.

In any case, where the total length of the pin 112 is to be minimized, the length of the end portion 200 could be a fixed dimension and would not vary with the grip range and would be approximately equal to the sum of the D dimension plus the length JL of the jaws 207, i.e. D+JL. However, for a minimum length pin, in situations where pull together of the workpieces is contemplated then the length of end portion 200 should be increased by between approximately one half to one times the nominal diameter Dp of the pin member 112 and in that case the length of end portion 200 would be generally fixed at a dimension of D+JL+(between ½ and 1)×Dp.

Thus with the construction of a fastener 110 having a pin member such as 112 a single pin member can accommodate a wide grip range and conventional jaw structures can be utilized. For a given grip range, use of approximately the minimum length necessary for end portion 200 will result in a reduction in the amount of material to be discarded after the fastener is set, i.e. the length of the pin member 112 from the one groove 116 at which it severs to the end.

In the latter discussion, elements 114, 119, 134, 136, 144, 154, 156, 158 and 162 of FIGS. 6–8 are similar to and perform functions similar to their lower numbered counterparts, i.e. 14, 19, etc., of FIGS. 1–5 and hence a description of these elements has been omitted for purposes of simplicity.

While it will be apparent that the preferred embodiment of the invention disclosed is well calculated to provide the advantages and features above stated, it will be appreciated that the invention is susceptible to modification, variation and change without departing from the proper scope or fair meaning of the subjoined claims.

What is claimed is:

1. In a two piece fastener for fastening a plurality of workpieces together with the workpieces having a thickness varying from a determinable minimum to a determinable maximum thickness, comprising a pin member having a head and a shank portion having a plurality of grooves thereon and a tubular member adapted to be swaged into locking engagement with a predetermined number of said grooves on the shank portion of the pin member by means of a tool having a swaging anvil adapted to engage the tubular member and gripping means adapted to grip a gripping portion of the shank portion, the tool being actuable to apply a relative axial tensile force between the pin member and the tubular member whereby the tubular member is swaged into said predetermined number of said grooves on the shank portion of the pin member, at least said predetermined number of said grooves being annular combination locking and breakneck grooves, each of said predetermined number of said grooves being defined by first and second radially outwardly diverging sidewalls, the improvement comprising the juncture of said diverging sidewalls at each of the grooves including a concave radius portion interconnecting the radially inner ends of said first and second sidewalls, a selected one of the grooves being located at a predetermined location proximate the outer end of the tubular member and adapted to receive the material of the tubular member as it is swaged onto the shank portion, said first and second sidewalls being angulated such as to provide a relative force between said sidewalls in said selected one of the grooves, said force being generated by the material of the tubular member as it is swaged therein, wherein said relative force will be additive with the relative axial tensile force applied by the tool such that the shank portion will fracture at said selected one of the grooves, said convace radius portion being of a magnitude selected to provide a predetermined stress concentration to facilitate fracture at said selected one of the grooves in response to the combination of said relative force and said relative axial tensile force, any one of the grooves being capable of functioning as said selected one of the grooves when located at said predetermined location while said pulling tool exerts the relative axial tensile force on the pin member, said gripping portion of the shank portion located at the end opposite said head and having a plurality of different grooves adapted to be gripped by the gripping means of the tool, said different grooves having a shape different from that of said combination grooves to avoid an effective stress concentration of the magnitude of said predetermined stress concentration and wherein said different grooves have an axial length substantially equal to the distance between the point of engagement of said swaging anvil with said tubular member and the forward end of said gripping means plus the axial length of the portion of said gripping means engaging said gripping portion less the axial length of the transition portion.

2. The fastener of claim 1 with said combination grooves providing a preselected grip range from the determinable minimum to the determinable maximum such that the tubular member will be swaged substantially only into said combination grooves for workpieces within said grip range and the gripping means will substantially engage only said different grooves for workpieces within said grip range.

3. In a two piece fastener for fastening a plurality of workpieces together with the workpieces having a thickness varying from a determinable minimum to a determinable maximum thickness, comprising a pin member having a head and a shank portion having a plurality of grooves thereon and a tubular member adapted to be swaged into locking engagement with a predetermined number of said grooves on the shank portion of the pin member by means of a tool having a swaging anvil adapted to engage the tubular member and gripping means adapted to grip a gripping portion of the shank portion, the tool being actuable to apply a relative axial tensile force between the pin member and the tubular member whereby the tubular member is swaged into said predetermined number of said grooves on the shank portion of the pin member, at least said predetermined number of said grooves being similarly contoured annular combination locking and breakneck grooves, each of said predetermined number of said grooves being defined by first and second radially outwardly diverging sidewalls, said first sidewall being positioned closer to said head then said second sidewall and forming an included angle with a radial plane extending transversely through said shank greater than the angle formed by said second sidewall, the improvement comprising the juncture of said diverging sidewalls at each of the grooves being defined by a concave radius portion interconnecting the radially inner ends of said first and second sidewalls, a selected one of the grooves being located at a predetermined location proximate the outer end of the tubular member and adapted to receive the material of the tubular member as it is swaged onto the shank portion, said first and second sidewalls being angulated such as to provide a relative axial force between said sidewalls in said selected one of the grooves, said force being generated by the material of the tubular member as it is swaged therein, whereby said relative axial force will be additive with the relative axial tensile force applied by the tool such that the shank portion will fracture at said selected one of the grooves, said concave radius portion being of a magnitude selected to provide a predetermined stress concentration to facilitate fracture at said selected one of the grooves in response to the combination of said relative axial force and said relative axial tensile force, any one of the grooves being capable of functioning as said selected one of the grooves when located at said predetermined location while said pulling tool exerts the relative axial tensile force on the pin member, said gripping portion of the shank portion located at the end opposite said head and having a plurality of different grooves adapted to be gripped by the gripping means of the tool, said different grooves having a shape different from that of said combination grooves to avoid an effective stress concentration of the magnitude of said predetermined stress concentration, said combination grooves providing a preselected grip range from the determinable minimum to the determinable maximum such that the tubular member will be swaged substantially only into said combination grooves for workpieces within said grip range and the gripping means will substantially engage only said different grooves for workpieces within said grip range, said grip range being the maximum allowable for the full operation of the swaging anvil and gripping means of the tool.

4. The fastener of claim 3 with the gripping means of the tool comprising a plurality of jaws and with said maximum allowable grip range being selected to be approximately the distance from the point of engagement of the swaging anvil with the tubular member to the beginning of said jaws.

5. The fastener of claim 4 with said different grooves extending for a length approximately equal to the sum of said maximum allowable grip range plus the effective length of the jaws.

6. The fastener of claim 4 with said different grooves extending for a length approximately equal to the sum of said maximum allowable grip range plus the effective length of the jaws plus a length equal to approximately no more than the diameter of the shank portion.

7. The fastener of claim 4 with said combination grooves extending along said shank portion from a point equal to at least around the minimum thickness to a point approximately equal to the length of the tubular member extending beyond the workpieces plus the distance from the point of engagement of the swaging anvil with the tubular member to the beginning of said jaws.

8. The fastener of claim 7 with said different grooves extending for a length approximately equal to the sum of said maximum allowable grip range plus the effective length of the jaws plus a length equal to approximately no more than the diameter of the shank portion.

9. The fastener of claim 6 wherein the tubular member has a preselected hardness less than the pin member and related thereto such that said tubular member has a hardness in the range of approximately from $45R_B$ to $65R_B$ when said pin has a hardness in the range of approximately from $15R_C$ to $25R_C$ so as to thereby provide controlled flow of the swaged material of the tubular member whereby fracture will occur at said selected one of the grooves.

10. In a two piece fastener for fastening a plurality of workpieces together with the workpieces having a thickness varying from a determinable minimum to a determinable maximum thickness, comprising a pin member having a head and a shank portion having a plurality of grooves thereon and a tubular member adapted to be swaged into locking engagement with a predetermined number of said grooves on the shank portion of the pin member by means of a tool having a swaging anvil adapted to engage the tubular member and gripping means adapted to grip a gripping portion of the shank portion, the tool being actuable to apply a relative axial tensile force between the pin member and the tubular member whereby the tubular member is swaged into said predetermined number of said grooves on the shank portion of the pin member, at least said predetermined number of said grooves being substantially identical annular combination locking and breakneck grooves, each of said predetermined number of said grooves being defined by first and second radially outwardly diverging sidewalls, said first sidewall being positioned closer to said head than said second sidewall and forming an included angle with a radial plane extending transversely through said shank greater than the angle formed by said second sidewall, the improvement comprising the juncture of said diverging sidewalls at each of the grooves being defined by a concave radius portion interconnecting the radially inner ends of said first and second sidewalls, a selected one of the grooves being located at a predetermined location proximate the outer end of the tubular member and adapted to receive the material of the tubular member as it is swaged onto the shank portion, said first and second sidewalls being angulated such as to provide a relative axial force between said sidewalls in said selected one of the grooves, said force being generated by the material of the tubular member as it is swaged therein, whereby said relative axial force will be additive with the relative axial tensile force applied by the tool such that the shank portion will fracture at said selected one of the grooves, said concave radius portion being of a magnitude selected to provide a predetermined stress concentration to facilitate fracture at said selected one of the grooves in response to the combination of said relative axial force and said relative axial tensile force, said concave radius portion having a radius related to the pin diameter in a range of between the ratio of around 1:50 and around 2:50 so as to provide said predetermined stress concentration, any one of the grooves being capable of functioning as said selected one of the grooves when located at said predetermined location while said pulling tool exerts the relative axial tensile force on the pin member, said gripping portion of the shank portion located at the end opposite said head and having a plurality of different grooves adapted to be gripped by the gripping means of the tool, said different grooves having a shape different from that of said combination grooves to avoid an effective stress concentration of the magnitude of said predetermined stress concentration, said combination grooves providing a preselected grip range from the determinable minimum to the determinable maximum such that the tubular member will be swaged substantially only into said combination grooves for workpieces within said grip range and the gripping means will substantially engage only said different grooves for workpieces within said grip range, said grip range being the maximum allowable for the full operation of the swaging anvil and gripping means of the tool.

11. The fastener of claim 10 with the gripping means of the tool comprising a plurality of jaws and with said maximum allowable grip range being selected to be approximately the distance from the point of engagement of the swaging anvil with the tubular member to the beginning of said jaws, said different grooves extending for a length approximately equal to the sum of said maximum allowable grip range plus the effective length of the jaws, said different grooves extending for a length approximately equal to the sum of said maximum allowable grip range plus the effective length of the jaws plus a length equal to approximately no more than the diameter of the shank portion.

12. The fastener of claim 11 with said combination grooves extending along said shank portion from a point equal to at least around the minimum thickness to a point approximately equal to the length of the tubular member extending beyond the workpieces plus the distance from the point of engagement of the swaging anvil with the tubular member to the beginning of said jaws.

13. The fastener of claim 12 wherein the tubular member has a preselected hardness less than the pin member and related thereto such that said tubular member has a hardness in the range of approximately from $45R_B$ to $65R_B$ when said pin has a hardness in the range of approximately from $15R_C$ to $25R_C$ so as to thereby provide controlled flow of the swaged material of the tubular member whereby fracture will occur at said selected one of the grooves.

14. In a two piece fastener for fastening a plurality of workpieces together with the workpieces having a thickness varying from a determinable minimum to a determinable maximum thickness, comprising a pin member having a head and a shank portion having a plurality of grooves thereon and a tubular member adapted to be swaged into locking engagement onto the shank portion of the pin member by means of a tool having a swaging anvil adapted to engage the tubular member and gripping means adapted to grip a gripping portion of the shank portion, the tool being actuable to apply a relative axial tensile force between the pin member and the tubular member whereby the tubular member is swaged into a predetermined number of said plurality of grooves of the shank portion of the pin member, said predetermined number of said grooves being annular combination locking and breakneck grooves, each of said predetermined number of said grooves being defined by first and second radially outwardly diverging sidewalls, said first sidewall being positioned closer to said head than said second sidewall and forming an included angle with a radial plane extending transversely through said shank greater than the angle formed by said second sidewall, the improvement comprising the juncture of said diverging sidewalls at each of the grooves being defined by a concave radius portion interconnecting the radially inner ends of said first and second sidewalls, a convex radius portion interconnecting a said second sidewall of one of the grooves and a said first sidewall of an immediately adjacent one of the grooves, a selected one of the grooves being located at a predetermined location proximate the outer end of the tubular member and adapted to receive the material of the tubular member as it is swaged onto the shank portion, said first and second sidewalls being angulated such as to provide a relative axial force between said sidewalls in said selected one of the grooves, said force being generated by the material of the tubular member as it is swaged therein, whereby said relative axial force will be additive with the relative axial tensile force applied by the tool such that the shank portion will fracture at said selected one of the grooves, said concave radius portion being of a magnitude selected to provide a predetermined stress concentration to facilitate fracture at said selected one of the grooves in response to the combination of said relative axial force and said relative axial tensile force, said convex radius portion being of a magnitude selected to facilitate a desired flow of material during swaging of the tubular member, any one of the grooves being capable of functioning as said selected one of the grooves when located at said predetermined location while said pulling tool exerts the relative axial tensile force on the pin member, said gripping portion of the shank portion located at the end opposite said head and having a plurality of different grooves adapted to be gripped by the gripping means of the tool, said different grooves having a shape different from that of said combination grooves to avoid an effective stress concentration of the magnitude of said predetermined stress concentration, said combination grooves providing a preselected grip range from the determinable minimum to the determinable maximum such that the tubular member will be swaged substantially only into said combination grooves for workpieces within said grip range and the gripping means will substantially engage only said different grooves for workpieces within said grip range, said grip range being the maximum allowable for the full operation of the swaging anvil and gripping means of the tool.

15. The fastener of claim 14 with the gripping means of the tool comprising a plurality of jaws and with said maximum allowable grip range being selected to be approximately the distance from the point of engagement of the swaging anvil with the tubular member to the beginning of said jaws, said different grooves extending for a length approximately equal to the sum of said maximum allowable grip range plus the effective length of the jaws on point plus a length equal to approximately no more than the diameter of the shank portion, said combination grooves extending along said shank portion from a point equal to at least around the minimum thickness to a point approximately equal to the length of the tubular member extending beyond the workpieces plus the distance from the point of engagement of the swaging anvil with the tubular member to the beginning of said jaws.

16. The fastener of claim 15 wherein the tubular member has a preselected hardness less than the pin member and related thereto such that said tubular member has a hardness in the range of approximately from $45R_B$ to $65R_B$ when said pin has a hardness in the range of approximately from $15R_C$ to $25R_C$ so as to thereby provide controlled flow of the swaged material of the tubular member whereby fracture will occur at said selected one of the grooves.

17. The fastener of claim 3 wherein said determinable minimum grip is approximately equal to said determinable maximum grip plus the axial length of the transition portion between said combination grooves and said different grooves less the axial distance between the point of engagement of said swaging anvil with said tubular member and the forward face of that portion of said gripping means engageable with said different grooves.

18. In a two piece fastener for fastening a plurality of workpieces together with the workpieces having a thickness varying from a determinable minimum to a determinable maximum thickness, comprising a pin member having a head and a shank portion having a plurality of grooves thereon and a tubular member adapted to be swaged into locking engagement with a predetermined number of the grooves on the shank portion of the pin member by means of a single action tool having a swaging anvil adapted to engage the tubular member and gripping means adapted to grip a gripping portion of the shank portion, the gripping means including a plurality of jaw members having a plurality of teeth with a preselected pitch, the tool being actuable to set said fastener by applying a relative axial tensile force between the pin member and the tubular member substantially entirely through said engagement of said swaging anvil with said tubular member whereby the tubular member is swaged into the predetermined number of the grooves on the shank portion of the pin member, the improvement comprising said pin member with at least said predetermined number of said combination grooves being annular combination locking and breakneck grooves, each of said predetermined number of said combination grooves being defined by first and second radially outwardly diverging sidewalls, said first sidewall being positioned closer to said head than said second sidewall and forming a preselected included angle with a radial plane extending transversely through said shank, a selected one of said combination grooves being located at a predetermined location proximate the outer end of the tubular member and adapted to receive the material of the tubular member as it is swaged onto the shank portion by said swaging anvil whereby the shank portion will fracture at said selected one of the grooves, any one of said combination grooves being capable of functioning as said selected one of said combination grooves when located at said predetermined location while said pulling tool exerts the relative axial tensile force on said pin member, said gripping portion of the shank portion located at the end opposite said head and having a plurality of different grooves with a minimum length transition portion between said combination grooves and said different grooves, said different grooves being adapted to be gripped by the gripping means of the tool, said different grooves having a shape different from that of said combination grooves whereby said different grooves will not effectively function as a breakneck groove.

* * * * *

UNITED STATES PATENT AND TRADEMARK OFFICE
CERTIFICATE OF CORRECTION

PATENT NO. : 4,342,529

DATED : August 3, 1982

INVENTOR(S) : Walter J. Smith

It is certified that error appears in the above—identified patent and that said Letters Patent is hereby corrected as shown below:

Column 2, line 55, "extent" should be --extend--.

Column 7, line 30, (Claim 1) "wherein" should be --whereby--.

Column 7, line 33, (Claim 1) "convace" should be --concave--.

Signed and Sealed this

Twenty-sixth Day of October 1982

[SEAL]

Attest:

GERALD J. MOSSINGHOFF

Attesting Officer　　Commissioner of Patents and Trademarks